United States Patent [19]
Irikura et al.

[11] Patent Number: 5,099,936
[45] Date of Patent: Mar. 31, 1992

[54] POWER TAKE-OFF TRANSMISSION FOR TRACTORS

[75] Inventors: Koji Irikura, Nishinomiya; Toshiyuki Hasegawa, Ashiya, both of Japan

[73] Assignee: Kansaki Kokyukoki Mfg. Co., Ltd., Amagasaki, Japan

[21] Appl. No.: 686,583

[22] Filed: Apr. 17, 1991

[30] Foreign Application Priority Data

Apr. 27, 1990 [JP] Japan .................. 2-46469

[51] Int. Cl.⁵ .............. B60K 17/28; F16H 37/08
[52] U.S. Cl. ............................... 180/53.1
[58] Field of Search ............ 180/53.1, 53.62, 53.7, 180/70.1; 74/15.6, 15.63, 15.8, 15.2

[56] References Cited

U.S. PATENT DOCUMENTS

| | | | |
|---|---|---|---|
| 3,613,815 | 10/1971 | Meylink et al. | 180/53.1 |
| 3,613,816 | 10/1971 | Gutbrod | 180/53.1 |
| 4,262,768 | 4/1981 | Itatani et al. | 180/53.1 |
| 4,613,024 | 9/1986 | Irikura . | |
| 4,632,200 | 12/1986 | Doyen et al. | 180/53.1 |
| 4,880,070 | 11/1989 | Irikura | 180/53.1 |
| 4,914,907 | 4/1990 | Okada | 180/53.1 |
| 5,046,994 | 9/1991 | Hasegawa et al. | 180/53.1 |

FOREIGN PATENT DOCUMENTS 61-153631 9/1986 Japan .
1-167921 11/1989 Japan .

Primary Examiner—Robert P. Olszewski
Assistant Examiner—Steven M. Reiss

[57] ABSTRACT

In a tractor having a mid-PTO shaft (13) and a rear-PTO shaft (22) which are journalled in a transmission casing (10) disposed between left and right rear wheels (12), a PTO-selecting clutch (20) for selectively operating both of or any one of the PTO shafts is disposed on a rear end portion (13a) of the mid-PTO shaft. The selecting clutch includes an input gear (17), drivenly connected to a drive shaft (14) through a PTO-clutch (15) and through a first gearing (16), and an intermediate gear (19) drivingly connected to the rear-PTO shaft. In a preferred embodiment, a second rear-PTO shaft (24) is provided on which the intermediate gear is fixedly mounted. The selecting clutch disposed on the mid-PTO shaft contributes to make the structure and parts of power take-off transmission assembly largely common between tractors having both of the mid- and rear-PTO shafts and having only a mid-PTO shaft.

2 Claims, 5 Drawing Sheets

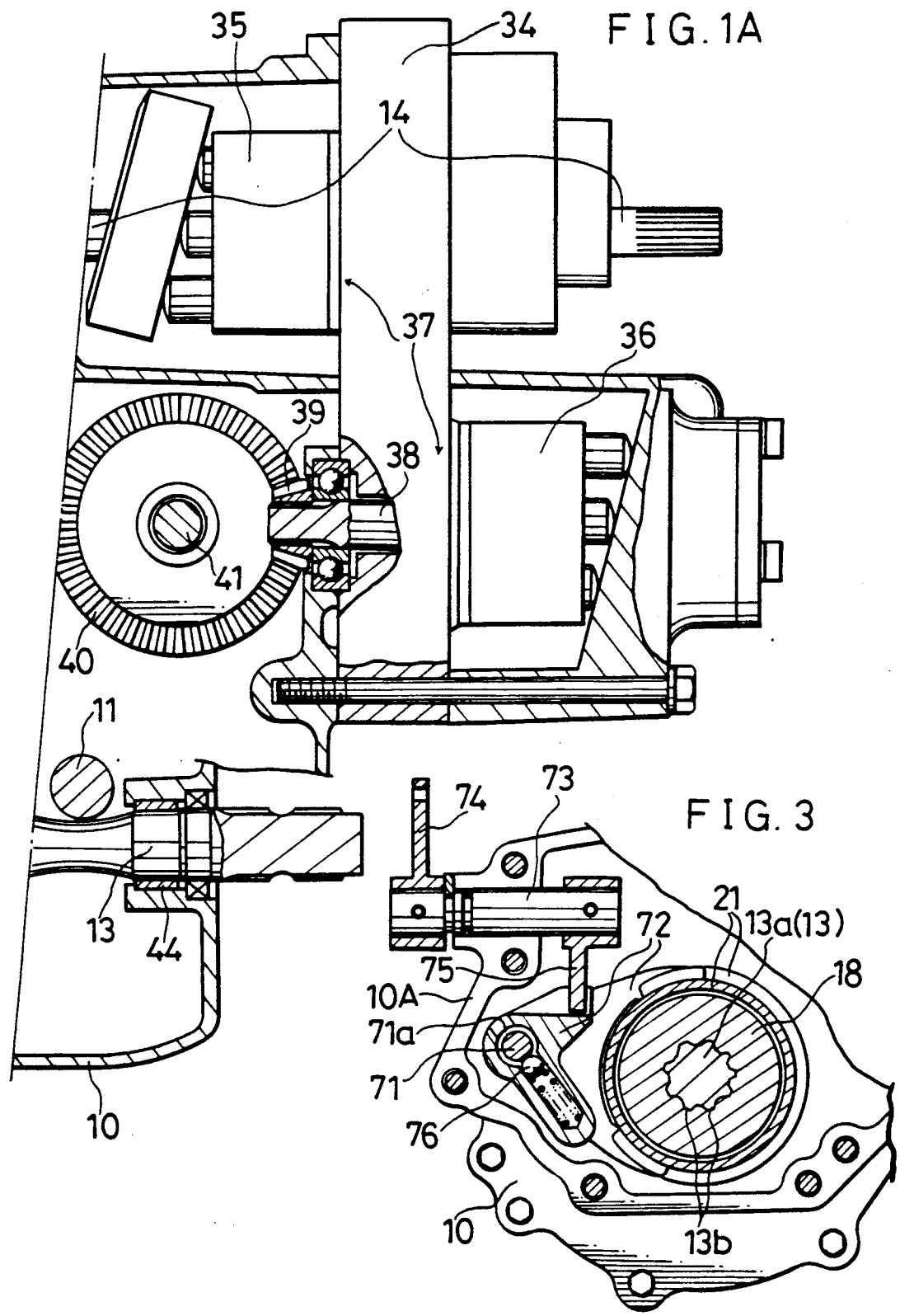

POWER TAKE-OFF TRANSMISSION FOR TRACTORS

FIELD OF THE INVENTION

This invention relates to a transmission for taking-off auxiliary implement-driving power in a tractor in which axles of left and right rear wheels are supported rotatably by a transmission casing disposed between the left and rear wheels and in which the transmission casing includes a mid-PTO shaft which extends forwardly from the transmission casing at a low level of the casing. More particularly, the present invention relates to a power take-off transmission which includes, besides the mid-PTO shaft, set forth above, for driving a mid-mount auxiliary implement such as a mid-mount mower to be mounted between front and rear wheels of a tractor at an underside of the tractor body, a rear-PTO shaft which extends rearwardly from the transmission casing at a level higher than that of the mid-PTO shaft for driving an auxiliary implement such as a rotary tiller to be drawn by the tractor.

BACKGROUND OF THE INVENTION

In a case when a rear-PTO shaft is to be additionally provided for the purpose of enlarging the usefulness of a tractor in which only a mid-PTO shaft is provided as power take-off shaft as shown, for example, in JP,U No.61-153631, a clutch mechanism is usually provided for enabling to drive selectively both of the mid- and rear-PTO shafts or any one of these PTO shafts.

As clutch mechanism of this purpose, there are known two types of the clutch mechanism. One of them is fashioned as shown, for example, in JP,U No.1-167921 such that it comprises a clutch, for connecting and disconnecting transmission of power to the mid-PTO shaft, and another clutch for connecting and disconnecting transmission of power to the rear-PTO shaft. The other type is shown in, for example, U.S. Pat. Nos. 4,613,024 and 4,880,070 and is fashioned such that it comprises a single PTO-selecting clutch which is operable to control transmission of power to both of the mid- and rear-PTO shafts.

A clutch mechanism of the former type having two separate clutches requires a complicated control mechanism. That is, when it is designed to control the two clutches individually, separate two control mechanisms are required and, when it is designed to control both of the two clutches simultaneously, a complicated link mechanism is required.

On the other hand, although a clutch mechanism of the latter type having a single PTO-selecting clutch may be operated by means of a simple control mechanism, this clutch mechanism involves a problem that it is difficult to make the structure and parts of a power take-off transmission assembly common, for a cost-saving purpose, to both of the tractors having only a mid-PTO shaft and having a rear-PTO shaft in addition to a mid-PTO shaft. That is, as shown in each of the U.S. Patents referred to above, a PTO-selecting clutch according to the prior art is incorporated in an axiliary implement-driving power transmission path at a location considerably remote from the mid- and rear-PTO shafts and are connected to these two PTO shafts by means of separate two transmission paths each having a considerable length. A power take-off assembly of this structure including a PTO-selecting clutch is largely different in structure from the one to be employed in a tractor in which a rear-PTO shaft and PTO-selecting clutch are not provided and only a mid-PTO shaft is provided.

OBJECT

Accordingly, a primary object of the present invention is to provide a novel power take-off transmission for tractors in which a PTO-selecting clutch for selectively operating mid- and rear-PTO shafts is disposed on the mid-PTO shaft for enabling to make the structure and parts of this power take-off transmission largely common to those of the one for a tractor having only a mid-PTO shaft so as to enhance economy.

BRIEF DESCRIPTION OF THE DRAWINGS

Other objects and advantages of the invention will become readily apparent as the specification is considered in conjunction with the accompanying drawings in which:

FIGS. 1A and 1B are sectional side views, partially developed and partially omitted, of a part of a tractor in which an embodiment of the power take-off transmission according to the present invention is employed;

FIG. 3 is a sectional view taken generally along line III—III of FIG. 1B;

SUMMARY OF THE INVENTION

Figure 1B:
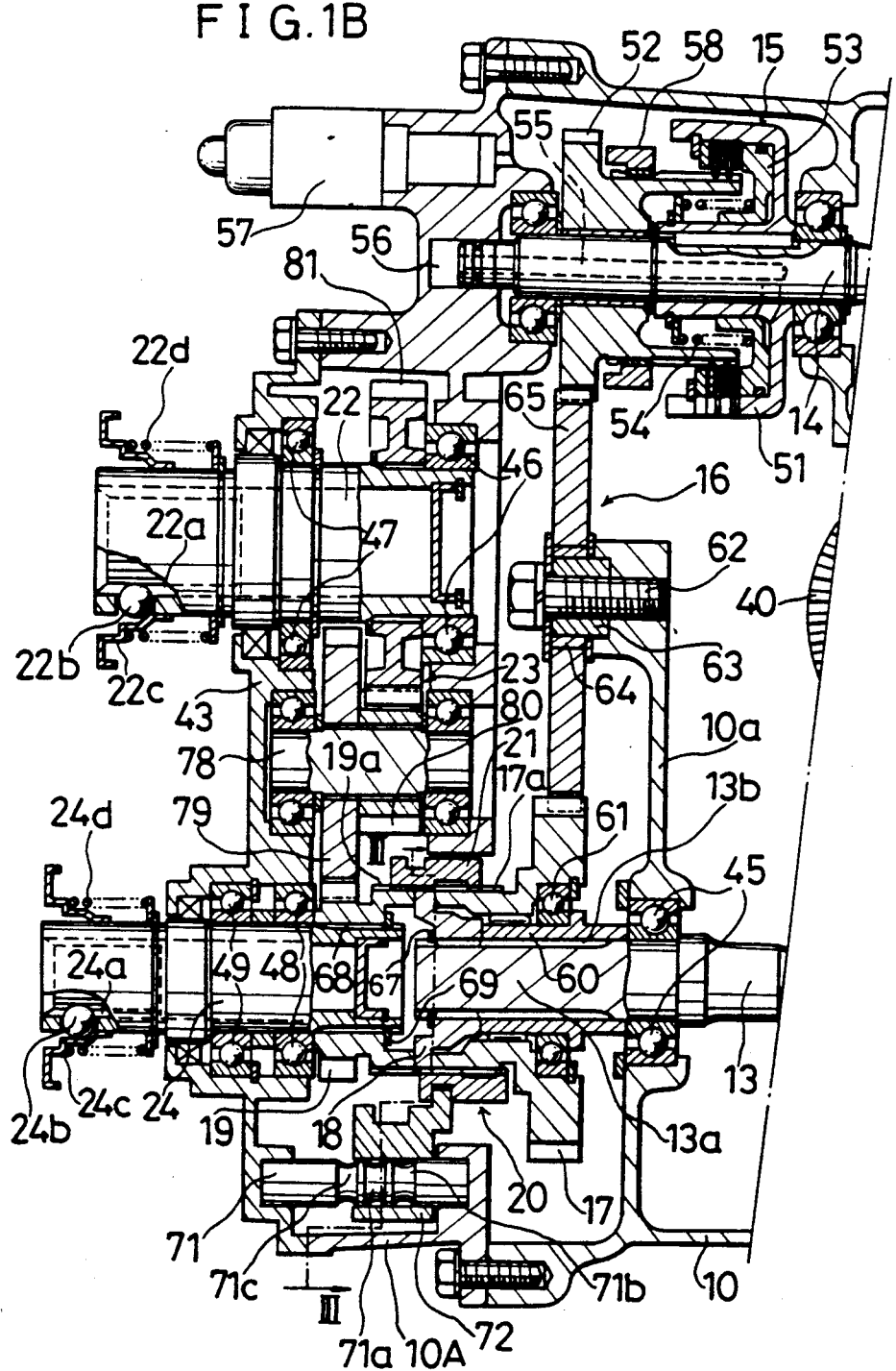
Figure 2:
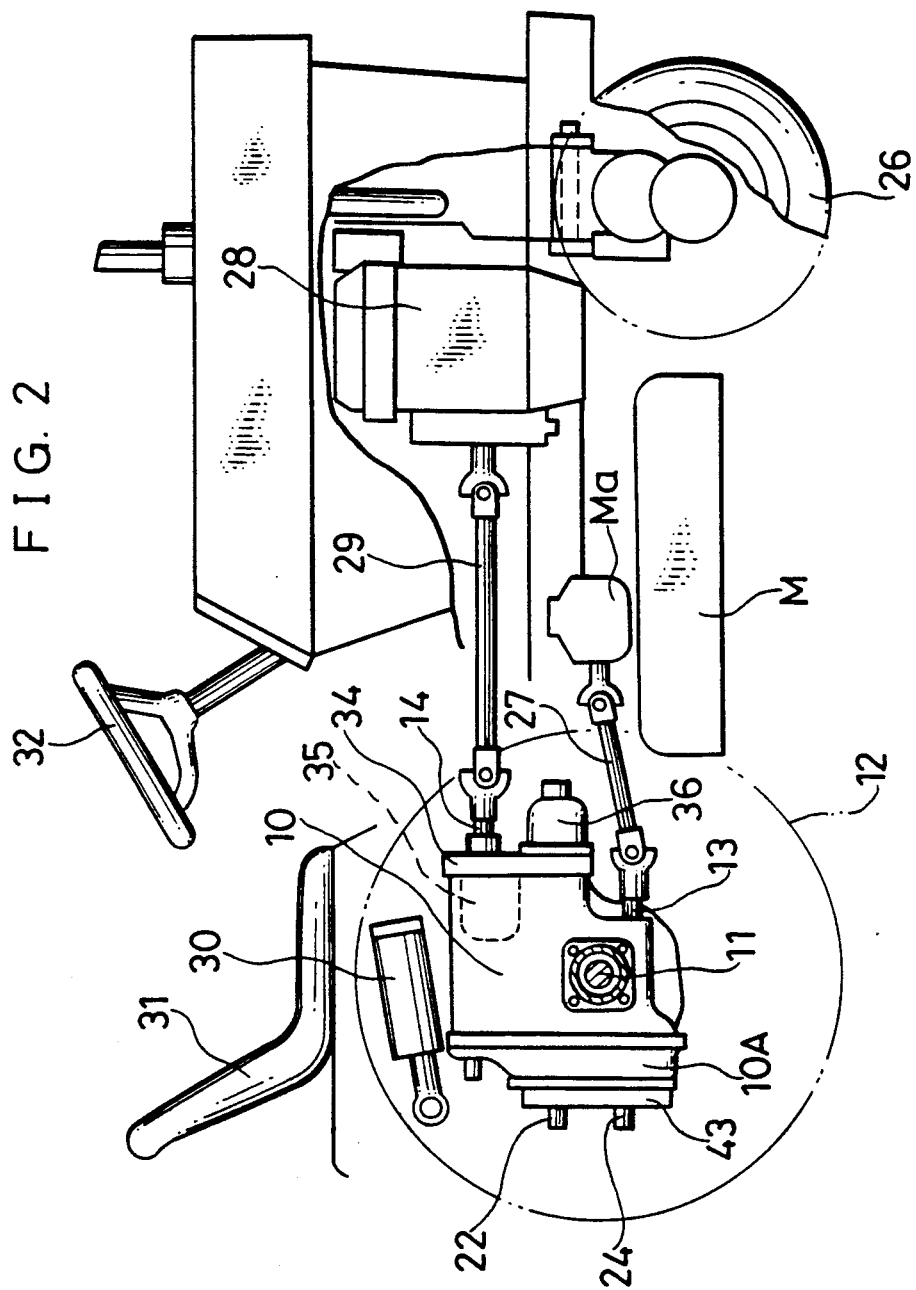
FIG. 2 is a schematic side view, partially cut-away, of the tractor.

The present invention relates to a power take-off transmission adapted for use in a tractor in which, as shown in FIGS. 1A, 1B and 2, axles 11 of left and right rear wheels 12 are supported rotatably by a transmission casing 10 which is disposed between the left and right rear wheels 12. The transmission casing 10 includes a mid-PTO shaft 13 which extends forwardly from the transmission casing at a low level of the casing 10.

As shown in FIGS. 1A and 1B, the mid-PTO shaft 13 includes, according to the present invention, a rear end portion 13a which has splines 13b at its outer peripheral surface and which extends rearwardly from an internal support wall 10a of the transmission casing for supporting the shaft 13 at a rearer side of this shaft. An input gear 17 is rotatably mounted on the rear end portion 13a and is drivenly connected to a drive shaft 14, which transmits auxiliary implement-driving power into the transmission casing 10, through a PTO-clutch 15 and through a first gearing 16.

A rotatable collar member 18 is disposed rearwardly of the input gear 17 and is fixedly mounted on the rear end portion 13a of mid-PTO shaft 13 using the splines 13b referred to above, whereas a rotatable intermediate gear 19 is disposed co-axially with and rearwardly of the rear end portion 13a of shaft 13. A clutch sleeve 21 is disposed between the input and intermediate gears 17 and 19. This clutch sleeve is shiftable on and throughout boss portions of the gears 17 and 19 and the collar member 18 so as to provide a PTO-selecting clutch 20 which is operable to connect the input gear 17 through the clutch sleeve 21 to both of the collar member 18 and intermediate gear 19 (FIG. 4), only to the collar member 18 (FIG. 5) or only to the intermediate gear 19 (FIG. 6).

As shown in FIG. 1B, the intermediate gear 19 is drivingly connected, according to the present invention, through a second gearing 23 to a rear-PTO shaft 22 which extends rearwardly from the transmission casing 10 at a level higher than that of the mid-PTO shaft 13.

In a preferred embodiment of the present invention, the intermediate gear 19 is fixedly mounted on a second rear-PTO shaft 24 which is disposed co-axially with the mid-PTO shaft 13 and extends rearwardly from the transmission casing 10. The second gearing 23 is preferably fashioned to a speed-reduction gearing.

In use, the PTO-clutch 15 is disengaged before operating the PTO-selecting clutch 20 for an easy operation of this clutch 20 and for preventing the possible damage of the clutch members 17, 18, 19 and 21 of clutch 20. The PTO-clutch 15 is kept disengaged when any of the PTO shafts 13 and 22 is not used, namely when, for example, the tractor is travelled along a road.

When both of the collar member 18 and intermediate gear 19 are connected to the input gear by the PTO-selecting clutch 20, the mid-PTO shaft 13 is driven to rotate through the collar member 18 and the rear-PTO shaft 22 is driven to rotate through the intermediate gear 19 and through the second gearing 23. Similarly, only the mid-PTO shaft 13 is driven to rotate when only the collar member 18 is connected to the input gear 17 by the PTO-selecting clutch 20, whereas only the rear-PTO shaft 22 is driven to rotate when only the intermediate gear 19 is connected to the input gear 17 by clutch 20.

Figure 7:
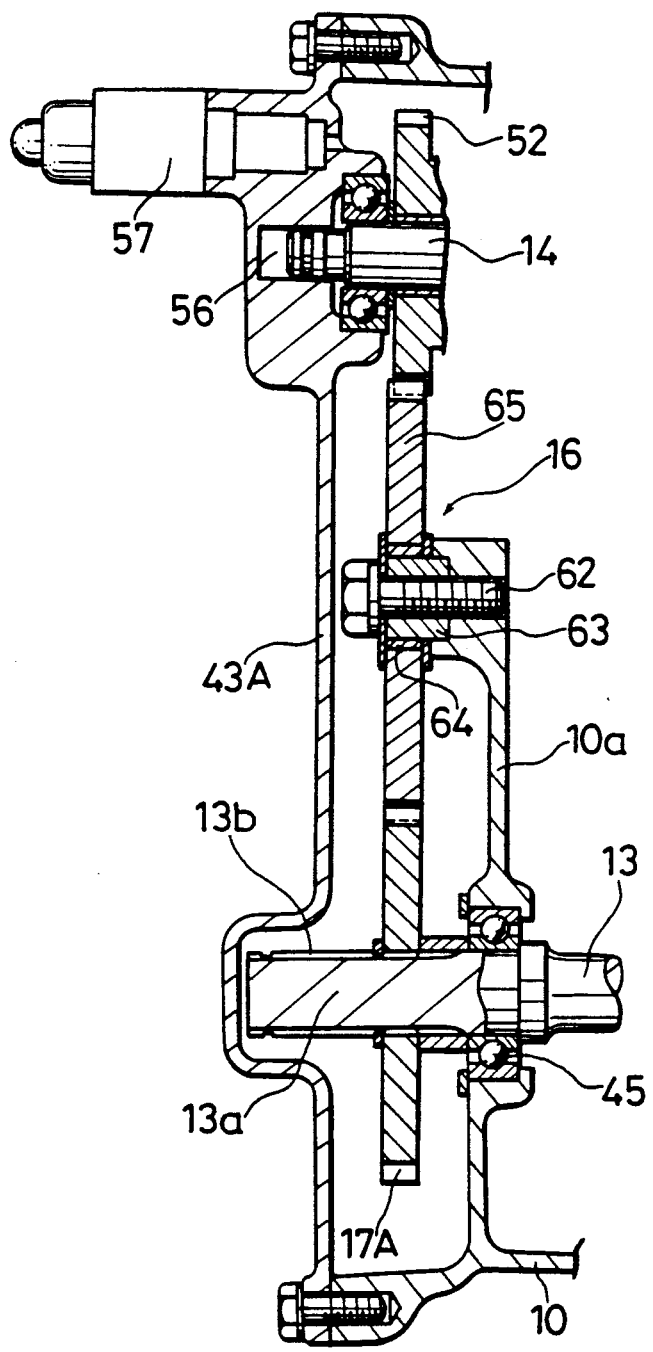
FIG. 7 is a sectional side view, partially developed, of a part of a tractor in which only a mid-PTO shaft is provided as power take-off shaft.

Owing to the arrangement of PTO-selecting clutch 20 on the rear end portion 13a of the mid-PTO shaft 13, a power take-off transmission for a tractor, which does not include a rear-PTO shaft corresponding to the shaft 22 shown, may be provided such that the PTO-selecting clutch 20 shown is removed, as shown in FIG. 7, and, in place of the input gear 17, another gear 17A is fixedly mounted on the rear end portion 13a of mid-PTO shaft 13 using splines 13b. Consequently, the part of power take-off transmission up to the first gearing 16 may have a same structure in a tractor including both of the mid- and rear-PTO shafts 13 and 22 and in a tractor including only the mid-PTO shaft 13. It is thus seen that the present invention enables to make the structure and parts of power take-off transmission largely common to the two kinds of tractors so as to enhance economy.

In a case where the second rear-PTO shaft 24, driven to rotate at a speed same as that of the input gear 17, is provided and where the second gearing 23 is fashioned to a speed-reduction gearing, the rear-PTO shaft 22 of a higher level having a relatively small speed of rotation and the second rear-PTO shaft 24 of a lower level having a relatively large speed of rotation may be used in manners different from each other in accordance with auxiliary implements to be drawn by the tractor.

For example, the rear-PTO shaft 22 of a higher level and relatively small speed of rotation may preferably be used as a drive source for an auxiliary implement such as a rotary tiller which has an input shaft of a relatively high level and which is subjected to a relatively high load. The second rear-PTO shaft 24 of a lower level and relatively large speed of rotation may preferably be used as a drive source for an auxiliary implement such as a grass collector which has an input shaft of a relatively low level and which is subjected to a relatively small load. Further, when a sprayer having a liquid medicine-feeding pump and a liquid medicine-spraying fan is drawn by the tractor for spraying agricultural medicines, the feeding pump, which is subjected to a relatively large load, may preferably be driven by means of rear-PTO shaft 22 of a lower speed and the spraying fan, which is desirous to be rotated at a high speed, may preferably be driven by the second rear-PTO shaft 24 of a higher speed.

DESCRIPTION OF A PREFERRED EMBODIMENT

FIG. 1 depicts a tractor in which a preferred embodiment of the power take-off transmission according to the present invention is employed.

The tractor shown is fashioned to a mower tractor in which a mower M is mounted at an underside of the vehicle body of tractor and between pairs of front wheels 26 and rear wheels 12. The mid-PTO shaft 13 referred to before is used for transmitting mower-driving power to a gear box Ma of the mower M through a transmission shaft 27. An engine 28 is mounted on a front portion of the vehicle, and power is supplied from this engine 28 into the transmission casing 10 through a transmission shaft 29. A hydraulic cylinder 30 is disposed above the transmission casing 10 for lifting and lowering an auxiliary implement (not shown) to be drawn by the tractor. An operator's seat 31 is disposed above the cylinder 30, and a steering wheel 32 for operating the left and right wheels 26 to turn is located before the seat 31.

As shown in FIGS. 1A and 2, a plate member 34 having a relatively large thickness is secured to the front of transmission casing 10. A hydrostatic transmission 37 for changing vehicle speed non-stepwisely is provided from a combination of a hydraulic pump 35 of variable displacement type, which is secured onto a rear surface of the plate member 34 at an upper portion of this member, and a hydraulic motor 35 of fixed displacement type which is secured onto a front surface of the plate member 34 at a lower portion of this member. As the drive shaft 14 set forth before, pump shaft of the hydraulic pump 35 is employed which extends forwardly of the plate member 34 and is connected to the transmission shaft 29 shown in FIG. 2.

As shown in FIG. 1A, motor shaft 38 of the hydraulic motor 36 extends through the plate member 34 into the transmission casing 10 and fixedly carries at its rearmost portion a bevel pinion 39. A bevel gear 40 meshing with the bevel pinion 39 is fixedly mounted on a transmission shaft 41 which is journalled in the transmission casing 10 and extends laterally of the casing. This shaft 41 is drivingly connected to the left and right rear wheel axles 11 through a gear train and through a differential gearing (both not shown).

As shown in FIG. 1B, a rear portion of the transmission casing 10 is composed of a casing member 10A, which somewhat extends at its portion except for an upper end portion rearwardly, and a rear cover 43 which closes a rear end opening of the casing member 10A. As shown in FIG. 1A, the mid-PTO shaft 13 is supported at its fronter side by a front wall of the transmission casing 10 through a sleeve bearing 44 and extends forwardly from the transmission casing at a location below the plate member 34. As shown in FIG. 1B, this mid-PTO shaft 13 is supported at its rearer side by the internal support wall 10a, referred to before, through a ball bearing 45. The drive shaft or pump shaft 14 extends rearwardly from the hydraulic pump 35 up to the casing member 10A and is supported at its rear end portion by the casing member. The rear-PTO shaft 22 is formed to a hollow shaft and is supported by a support wall portion of the casing member 10A and by the rear cover 43 through ball bearings 46 and 47. The second rear-PTO shaft 24 is also formed to a hollow shaft and is supported by the rear cover 43 through a pair of ball bearings 48 and 49.

As shown in FIG. 1B, the PTO-clutch 15 referred to before is fashioned to a fluid-operated frictional clutch comprising opposite sets of frictional elements which are slidably but non-rotatably supported by a clutch housing 51, fixedly mounted on the drive shaft 14, and by a gear 52 rotatably mounted on the shaft 14. As is usual, the fluid-operated PTO-clutch 15 further comprises an annular piston 53 which is disposed within the clutch housing 51 and is biased to move away from the frictional elements by a return spring 54. The clutch 15 is engaged by fluid under pressure, supplied through a fluid passage 55 in the drive shaft 14, which causes the piston 53 to move toward the frictional elements against the biasing force of return spring 54. The fluid passage 55 is communicated at its rear end to a fluid chamber 56 in the casing member 10A. An electromagnetic control valve 57 is secured onto a rear surface of the casing member 10A for controlling supply of fluid to the fluid-operated PTO-clutch 15. A brake 58 is disposed around a boss portion of the gear 52 for preventing an inertial rotation of the driven side of clutch 15 when the PTO-clutch is disengaged.

As also shown in FIG. 1B, the input gear 17 referred to before is rotatably mounted on the rear end portion 13a of mid-PTO shaft 13 through a positioning sleeve 60 and through a ball bearing 61. The support wall 10a extends from an inner bottom of the transmission casing 10 upwardly above the mid-PTO shaft 13 and carries at its upper end a hollow cylindrical support 63 through a bolt 62. A gear 65 is rotatably supported by the cylindrical support 63 through a sleeve bearing 64 and meshes with gear 52 on the drive shaft 14 and with input gear 17 on the rear end portion 13a of mid-PTO shaft 13 so as to provide the first gearing 16 set forth before.

Figure 4:
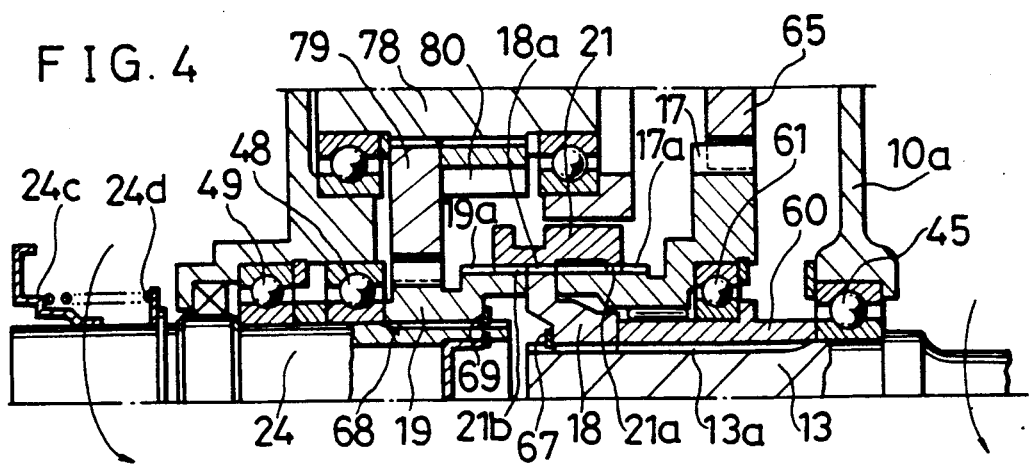
FIGS. 4, 5 and 6 are enclarged sectional side views of a PTO-selecting clutch shown in FIG. 1B, showing respectively different states of the clutch.
Figure 5:
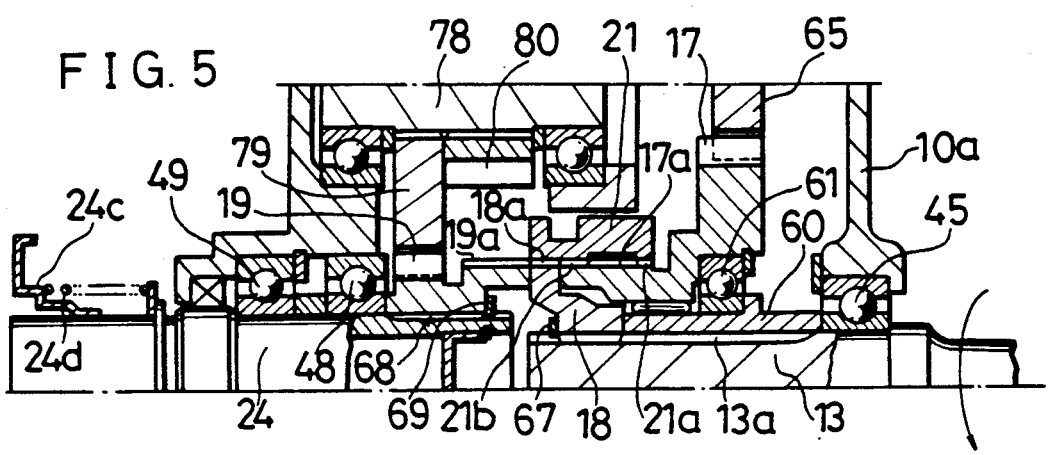
Figure 6:
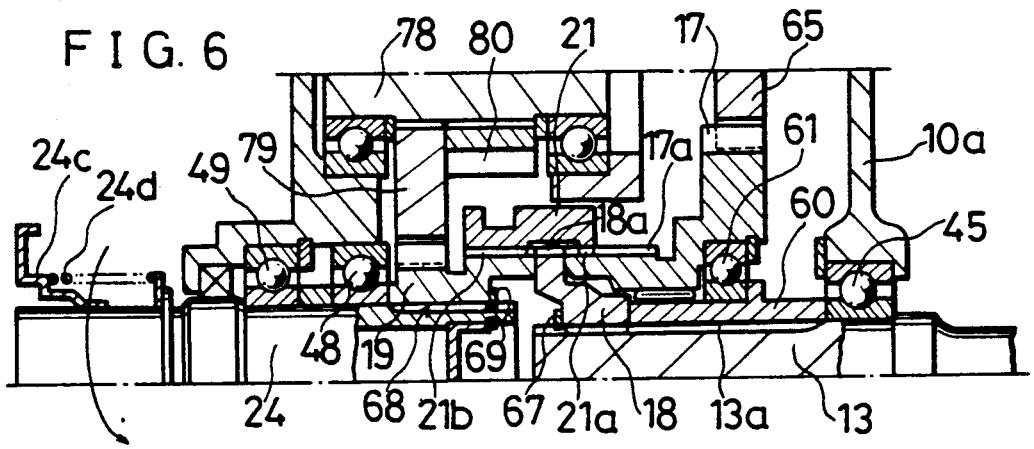

As shown in FIG. 1B and in FIGS. 4 to 6, the input gear 17 includes a rearwardly extending boss portion which has splines 17a formed in its outer surface. Collar member 18 is spline-fitted onto the rear end portion 13a of mid-PTO shaft 13 with being in abutment to the positioning sleeve 60 and is prevented from getting-away by a snap ring 67. This collar member 18 also has splines 18a which are aligned axially with splines 17a of the input gear 17. The intermediate gear 19 is fixedly mounted on a front end portion of the second rear-PTO shaft 24 using a splined connection 68 and is prevented from getting-away by a snap ring 69. This intermediate gear 19 includes a forwardly extending boss portion having at its outer surface splines 19a which are aligned axially with splines 17a and 18a of the input gear 17 and collar member 18.

As clearly shown in FIGS. 4 to 6, the clutch sleeve 21 includes in its inner surface two sets of axially spaced splines 21a and 21b. This clutch sleeve is fashioned such that it is slidingly displaced selectively to a mid position shown in FIG. 4, a foremost position shown in FIG. 5 and a rearmost position shown in FIG. 6. The forwardly located splines 21a of clutch sleeve 21 are arranged such that they are in meshment with splines 17a of the input gear 17 at any of the three positions of the clutch sleeve. The rearwardly located splines 21b are arranged such that they are in meshment with splines 18a and 19a of both of the collar member 18 and intermediate gear 19 at the mid position of clutch sleeve 21 shown in FIG. 4, and such that they are in meshment with splines 18a of only the collar member 18 at the foremost position of sleeve 21 shown in FIG. 5 whereas they are in meshment with splines 19a of only the intermediate gear 19 at the rearmost position of sleeve shown in FIG. 6.

Consequently, in accordance with positions of the clutch sleeve 21, both of the collar member 18 and intermediate gear 19 are connected to the input gear 17 at the mid position shown in FIG. 4, only the collar member 18 is connected to the input gear 17 at the foremost position shown in FIG. 5, and only the intermediate gear 19 is connected to the input gear 17 at the rearmost position shown in FIG. 6. In FIG. 1B, an upper half of the clutch sleeve 21 is illustrated at the position corresponding to that of FIG. 4 whereas a lower half is illustrated at the position corresponding to that of FIG. 5.

For operating the clutch sleeve 21 to slide, a fork 72 engaging the clutch sleeve is slidably mounted, as shown in FIGS. 1B and 3, on a guide shaft 71 which is supported by the casing member 10A and by the rear cover 43. A rotatable, horizontal control shaft 73 extends through a side wall portion of the transmission casing 10 at a junction between the casing member 10A and rear wall 43. The control shaft 73 carries at its outer end a clutch arm 74 and has an operating arm 75, attached to an inner end of this control shaft, which engages the fork 72. The guide shaft 71, along which the fork 72 is slidingly displaced by a rotational displacement of the control shaft 73, includes at its outer surface three annular grooves 71a, 71b and 71c into which a latching ball 76 disposed within the fork 72 may project under the biasing force of a spring at respective positions of the clutch sleeve 21 shown in FIGS. 4, 5 and 6 so as to thereby latch the clutch sleeve through fork 72.

As shown in FIG. 1B, an intermediate shaft 78 of a small length is disposed at a level between those of the mid- and rear-PTO shafts 13 and 22 and is rotatably supported by the casing member 10A and by the rear cover 43 through bearings. Larger and smaller gears 79 and 80 are fixedly mounted on the intermediate shaft 78. The larger gear 79 meshes with the intermediate gear 19 on the second rear-PTO shaft 24 so as to provide a speed-reduction gear train, and the smaller gear 80 meshes with a larger gear 81, fixedly mounted on the rear-PTO shaft 22, so as to provide another speed-reduction gear train. The second gearing 23 referred to before is composed of these two sets of speed-reduction gear trains.

As also shown in FIG. 1B, each of the rear-PTO shafts 22 and 24 comprises internal splines 22a, 24a for connecting a transmission shaft to be used for transmitting power to an auxiliary implement, a retaining ball 22b, 24b for preventing the transmission shaft from getting-away, an annular member 22c, 24c having a cam surface engaging the retaining ball 22b, 24b, and a spring 22d, 24d for forcing the annular member 22c, 24c so as to keep the cam surface thereof in engagement with the retaining ball 22b, 24b. For connecting the transmission shaft referred to above, the annular member 22c, 24c is once displaced forwardly against the biasing force of spring 22d, 24d.

As already described before, FIG. 7 illustrates a part of a power take-off transmission for a tractor in which a rear-PTO shaft is no more provided. The casing member 10A is eliminated, as shown, and a rear cover 43A is employed which does not include a bore for extending therethrough a rear-PTO shaft. In place of the input gear 17, a gear 17A is fixedly mounted on the rear end portion 13a of mid-PTO shaft 13 using splines 13b. The other parts within the transmission casing which parts are omitted from FIG. 7 are entirely same as those shown in FIGS. 1A and 1B. A PTO-clutch corresponding to the PTO-clutch 15 shown in FIG. 1B is used for connecting and disconnecting transmission of power to the mid-PTO shaft 13.

We claim:

1. In a tractor wherein axles of left and right rear wheels are supported rotatably by a transmission casing disposed between said left and right rear wheels, said transmission casing including a mid-PTO shaft which extends forwardly from said transmission casing at a low level of the casing, a power take-off transmission characterized in:

that said mid-PTO shaft (13) includes a rear end portion (13a), having splines (13b) at its outer peripheral surface, which extends rearwardly from an internal support wall (10a) of said transmission casing (10) for supporting said shaft at a rearer side of the shaft, an input gear (17) being rotatably mounted on said rear end portion and drivenly connected to a drive shaft (14), which transmits auxiliary implement-driving power into said transmission casing, through a PTO-clutch (15) and through a first gearing (16);

that a rotatable collar member (18), disposed rearwardly of said input gear (17), is fixedly mounted on said rear end portion (13a) using said splines (13b), whereas a rotatable intermediate gear (19) is disposed co-axially with and rearwardly of said rear end portion of the mid-PTO shaft, a clutch sleeve (21) being disposed between said input and intermediate gears and being shiftable on and throughout boss portions of said gears and said collar member so as to provide a PTO-selecting clutch (20) which is operable to connect said input gear through said clutch sleeve selectively to both of said collar member and said intermediate gear, to said collar member or to said intermediate gear; and that said intermediate gear (19) is drivingly connected through a second gearing (23) to a rear-PTO shaft (22) which extends rearwardly from said transmission casing (10) at a level higher than the level of said mid-PTO shaft (13).

2. A power take-off transmission as set forth in claim 1, wherein said intermediate gear (19) is fixedly mounted on a second rear-PTO shaft (24) which is disposed co-axially with said mid-PTO shaft (17) and extends rearwardly from said transmission casing (10), said second gearing (23) being fashioned to a speed-reduction gearing.

* * * * *

UNITED STATES PATENT AND TRADEMARK OFFICE
CERTIFICATE OF CORRECTION

PATENT NO. : 5,099,936

DATED : March 31, 1992

INVENTOR(S) : Koji Irikura et al

It is certified that error appears in the above-identified patent and that said Letters Patent is hereby corrected as shown below:

Col. 8, line 26 change "(17)" to --(13)--.

Signed and Sealed this

Twenty-second Day of March, 1994

Attest:

BRUCE LEHMAN

*Attesting Officer*      *Commissioner of Patents and Trademarks*